(12) United States Patent
Woo et al.

(10) Patent No.: US 10,409,447 B2
(45) Date of Patent: Sep. 10, 2019

(54) SYSTEM AND METHOD FOR ACQUIRING PARTIAL SPACE IN AUGMENTED SPACE

(71) Applicant: Korea Advanced Institute of Science and Technology, Daejeon (KR)

(72) Inventors: Woon Tack Woo, Daejeon (KR); Hyeong Mook Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/744,717

(22) PCT Filed: Sep. 7, 2015

(86) PCT No.: PCT/KR2015/009396
§ 371 (c)(1),
(2) Date: Jan. 12, 2018

(87) PCT Pub. No.: WO2017/010614
PCT Pub. Date: Jan. 19, 2017

(65) Prior Publication Data
US 2018/0210627 A1    Jul. 26, 2018

(30) Foreign Application Priority Data
Jul. 13, 2015   (KR) .................. 10-2015-0099124

(51) Int. Cl.
*G06F 3/0481*    (2013.01)
*G06F 3/01*    (2006.01)
(Continued)

(52) U.S. Cl.
CPC .......... *G06F 3/04815* (2013.01); *G06F 3/011* (2013.01); *G06F 3/012* (2013.01);
(Continued)

(58) Field of Classification Search
CPC ...... G06F 3/04815; G06F 3/013; G06F 3/017; G06T 19/006; G06T 19/20
See application file for complete search history.

(56) References Cited

U.S. PATENT DOCUMENTS 8,872,854 B1 * 10/2014 Levitt .................. G06F 3/147
345/633
9,261,954 B2 * 2/2016 Tsurumi .................. G06F 3/011
(Continued)

FOREIGN PATENT DOCUMENTS

KR    10-2012-0086266 A    8/2012
KR    10-2013-0053466 A    5/2013
(Continued)

OTHER PUBLICATIONS

Hyeong Mook Lee, "Toward 'Invoking Subspace': Efficient Acquisition of Target Space with Robust Pinches in Wearable Augmented Reality", Sep. 5, 2014, pp. 1-16.
(Continued)

*Primary Examiner* — Abderrahim Merouan (57) ABSTRACT

The present invention includes: a targeting unit configured to, when an event by a user's action is generated in a 3D image displayed on a display device, acquire a first subspace of a first three-dimensional (3D) shape corresponding to the user's action; and a refinement unit configured to acquire a second subspace of a second 3D shape, of which position and scale are adjusted according to a user's gesture within a range of the first subspace acquired by the targeting unit.

12 Claims, 9 Drawing Sheets

(51) Int. Cl.
　　　*G06T 19/00*　　(2011.01)
　　　*G06T 19/20*　　(2011.01)
　　　*G06F 3/03*　　(2006.01)
　　　*G06F 3/042*　　(2006.01)
　　　*G06F 3/0484*　　(2013.01)

(52) U.S. Cl.
　　　CPC .............. *G06F 3/013* (2013.01); *G06F 3/017* (2013.01); *G06F 3/0304* (2013.01); *G06F 3/0425* (2013.01); *G06F 3/04845* (2013.01); *G06T 19/006* (2013.01); *G06T 19/20* (2013.01)

(56) References Cited

U.S. PATENT DOCUMENTS

| | | | |
|---|---|---|---|
| 2009/0079731 A1* | 3/2009 | Fitzmaurice | G06F 3/04815 345/419 |
| 2012/0162258 A1* | 6/2012 | Kim | G06F 1/1626 345/633 |
| 2012/0194516 A1 | 8/2012 | Newcombe et al. | |
| 2013/0135315 A1 | 5/2013 | Bares et al. | |
| 2015/0212647 A1* | 7/2015 | Kim | G02B 27/017 345/173 |

FOREIGN PATENT DOCUMENTS

KR　　10-1470757 B1　　12/2014
WO　　WO 2011/083929 A2　　7/2011

OTHER PUBLICATIONS

Hyeong Mook Lee et al., "Egocentric Subspace Acquistion with Freehand Pinches in Augmented Space", Jan. 20, 2015, pp. 1-10.
International Search Report for International Patent Application No. PCT/KR2015/009396, filed on Sep. 7, 2015.

* cited by examiner

SYSTEM AND METHOD FOR ACQUIRING PARTIAL SPACE IN AUGMENTED SPACE

CROSS-REFERENCE TO RELATED APPLICATIONS

The present specification is a U.S. National Stage of International Patent Application No. PCT/KR2015/009396 filed Sep. 7, 2015, which claims priority to and the benefit of Korean Patent Application No. 10-2015-0099124 filed in the Korean Intellectual Property Office on Jul. 13, 2015, the entire contents of which are incorporated herein by reference.

TECHNICAL FIELD

The present invention relates to a system and a method for acquiring a subspace (partial space) in an augmented space, and more particularly, to a system and a method for acquiring a subspace in an augmented space, which, when an event by a user is generated, acquires a first subspace corresponding to the event and acquires a second subspace having a position and a scale adjusted within a range of the acquired first subspace.

BACKGROUND ART

Boeing developed a device for displaying positions of components at appropriate positions of an aircraft a on a head mounted display (HMD) when assembling the aircraft in the early 1990s, and the term "augmented reality (AR)" was derived for the first time in a paper that published this study. Research into the augmented reality has been started from this time. The augmented reality is currently being actively studied.

The AR is a technique for displaying a three-dimensional (3D) virtual object to be superimposed on a real world image (or real image) and improving the understanding of a real world by synthesizing a real world environment and a graphical virtual reality in real time based on reality. The purpose of the AR is to provide additional information or meaning about an object or a place actually observed. As compared with a virtual reality technique, the AR is reproduced by using a computer that can simulate various sensors, display devices (visual, auditory, tactile/tickling, or the like), and any phenomenon (fact or fiction) with interaction, and a virtual experience is created.

Techniques for 3D object tracking and scene restoration allow a user to register a 3D virtual object with some geometric transformation applied to a real space.

The augmented space increases virtual objects in a meaningful physical space authored by a service provider (for example, museums, tourism, model houses, interiors, games, and the like). Therefore, its physical objects may be generally pre-sampled and they can be tracked. This makes it possible for a user to interact more naturally and abundantly in a wider 3D space by various combinations of virtual and real situations. In this context, it has increased the importance of the partial 3D space centered at a particular moment by a head mounted display of a user in the field.

Considering a user in a wearable AR situation, it is difficult to directly apply egocentric metaphor and existing volumetric selection techniques to an augmented space in a virtual space. The biggest problem is physical boundary conditions from real objects. A user who meets obstacles so as to acquire an object of interest (OoI) at a certain place differs from a user in a virtual space with free transformation. For example, a target object is susceptible to damage by a user, may be disturbed by a surrounding environment, may be too small or too far away to be touched, or may be inappropriate from a combination thereof.

In order to solve these problems, far-sighted target selection or indirect pointing technique is an alternative to a viewing target.

However, the existing indirect approaches has a problem in that they cannot precisely select a 3D volume desired by a user, including IoOs and surroundings thereof.

DETAILED DESCRIPTION OF THE INVENTION

Technical Problem

The present invention has been made to solve the above-mentioned problems, and an object of the present invention is to provide a system and method for acquiring a subspace in an augmented space, in which a 3D subspace may be finely acquired by using bare hand pinches with respect to an augmented space.

In addition, another object of the present invention is to provide a system and method for acquiring a subspace in an augmented space, wherein, when an event by a user is generated, a first subspace corresponding to the event is acquired, and a second subspace having a position and a scale adjusted within a range of the acquired first subspace is acquired.

Another object of the present invention is to provide a system and method for acquiring a subspace in an augmented space, which provides a top view by orthogonal projection by taking into account a scale of a first subspace.

Technical Solution

According to one aspect of the present invention, a system for acquiring a subspace in an augmented space includes: a targeting unit configured to, when an event by a user's action is generated in a three-dimensional (3D) image displayed on a display device, acquire a first subspace of a first 3D shape corresponding to the user's action; and a refinement unit configured to acquire a second subspace of a second 3D shape, of which position and scale are adjusted according to a user's gesture within a range of the first subspace acquired by the targeting unit.

The targeting unit may include: an event detection unit configured to determine the user's action in the 3D image as an event occurrence; a projection unit configured to form a tunnel by projecting a two-dimensional (2D) frame formed by the user's action determined by the event detection unit into a 3D space; a tunnel casting unit configured to perform forward casting and backward casting by projecting a set of rays to the tunnel formed by the projection unit; and a first transformation unit configured to transform a frustum acquired by the tunnel casting unit to acquire the first subspace of the first 3D shape.

The refinement unit may include: an adjustment unit configured to form a new subspace through a user's two-handed pinch gesture within the range of the first subspace acquired by the targeting unit; a top view providing unit configured to provide a top view of the first subspace acquired by the targeting unit to help the adjustment unit form a subspace through the user's two-handed pinch gesture; and a second transformation unit configured to transform the subspace newly formed by the adjustment unit to acquire the second subspace of the second 3D shape.

The event detection unit may determine a pinch and release event operation by a user's two-handed pinch tip pointer in the 3D image as the event occurrence by the user's action.

The projection unit may form the tunnel by projecting the 2D frame formed by the pinch and release operation by the user's two-handed pinch tip pointer into the 3D space in the 3D image.

The tunnel casting unit may perform forward casting that finds a first collision point nearest from an eye that first collides with augmented objects where a set of rays projected from a user's eye exists in the tunnel, and backward casting that finds a first collision point farthest from the eye that first collides with augmented objects existing in the tunnel by projecting the same set of rays as the forward casting in an opposite direction.

The first transformation unit may acquire the first subspace by transformation into a first 3D shape having the same position, rotation, and volume according to definition of a subspace predetermined based on a center of a frustum including a first plane, which is a slice plane parallel to the tunnel including the first collision point nearest from the eye, and a second plane, which is a slice plane parallel to the tunnel including the first collision point farthest from the eye.

The adjustment unit may form a new subspace by directly changing through a relative scale mapping according to a user's two-handed pinch gesture within the range of the first subspace acquired by the targeting unit.

The top view providing unit may provide a top view by orthogonal projection by taking into account a scale of the first subspace acquired by the targeting unit and helps the adjustment unit form the subspace through a user's two-handed pinch gesture.

The second transformation unit may acquire the second subspace by transforming the subspace newly formed by the adjustment unit into the second 3D shape having the same position, rotation, and volume according to definition of a predetermined subspace.

The first and second 3D shapes may be a cuboid.

According to another aspect of the present invention, a method for acquiring a subspace in an augmented space includes: a first step of determining, by an event detection unit, a user's action in a three-dimensional (3D) image as an event occurrence; a second step of forming, by a projection unit, a tunnel by projecting a 2D frame formed by the determined action of the user into a 3D space; a third step of performing, by a tunnel casting unit, forward casting and backward casting by projecting a set of rays to the formed tunnel; a fourth step of transforming, by a first transformation unit, a frustum acquired by performing the forward casting and the backward casting to acquire a first subspace of a first 3D shape; a fifth step of forming, by an adjustment unit, a new subspace through a user's two-handed pinch gesture within the range of the first subspace acquired by the targeting unit; and a sixth step of transforming, by a second transformation unit, the newly formed subspace to acquire a second subspace of a second 3D shape.

The user's action in the first step may be a pinch and release operation by a two-handed pinch tip pointer.

Advantageous Effects

According to the present invention, a system and method for acquiring a subspace in an augmented space may finely acquire a 3D subspace by using bare hand pinches with respect to an augmented space.

In addition, a system and method for acquiring a subspace in an augmented space may acquire a first subspace corresponding to an event when the event by a user is generated, and acquire a second subspace having a position and a scale adjusted within a range of the acquired first subspace.

In addition, a system and method for acquiring a subspace in an augmented space may provide a top view by orthogonal projection by taking into account a scale of a first subspace.

BEST MODE

In order for sufficient understanding of the present invention, preferred embodiments of the present invention will be described with reference to the accompanying drawings. The embodiments of the present invention can be modified in various forms, and the scope of the present invention should not be construed as being limited to the examples described below. The embodiments of the present invention are provided so that those of ordinary skill in the art can completely understand the present invention. Therefore, the shape and the like of the components in the drawings can be exaggerated so as to emphasize a clearer explanation. It should be noted that the same members are denoted by the same reference numerals in the drawings. Furthermore, in the following descriptions and the accompanying drawings, descriptions of well-known functions and constructions will be omitted if they are considered to unnecessarily obscure the gist of the present invention.

Hereinafter, embodiments of the present invention will be described in detail with reference to the accompanying drawings.

Figure 1:
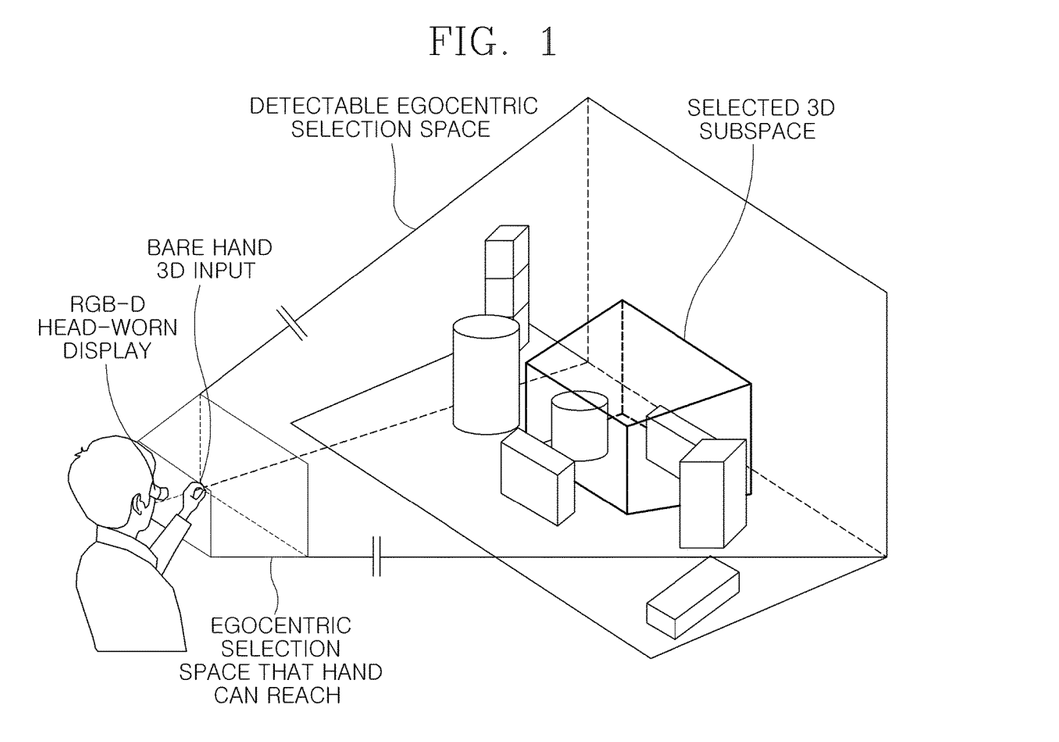
FIG. 1 is a plan view of an egocentric subspace acquisition.
Figure 2:
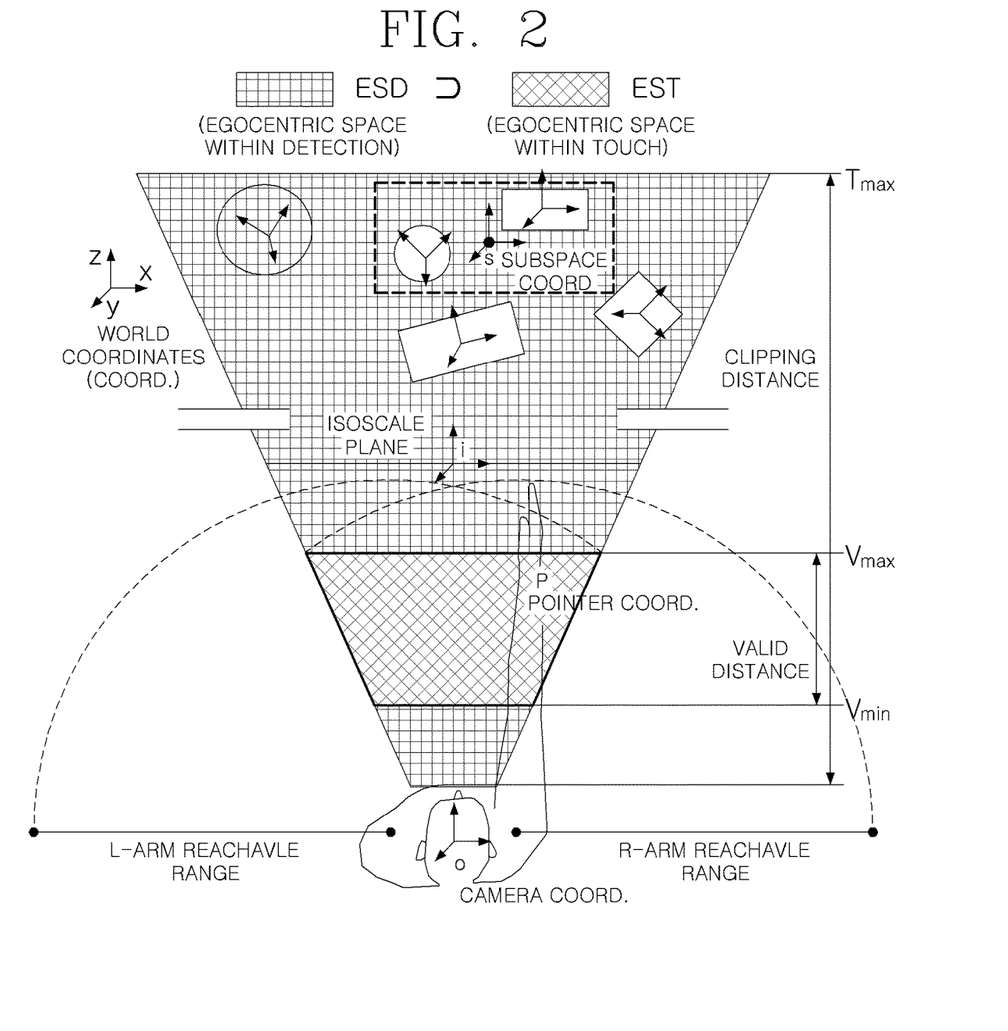
FIG. 2 is a top view of an egocentric interaction space with all components and a coordinate system.

FIG. 1 is a plan view of an egocentric subspace acquisition, and FIG. 2 is a top view of an egocentric interaction space with all components and a coordinate system.

Referring to FIGS. 1 and 2, the present invention must design external factors in advance so as to utilize a subspace acquisition in an egocentric metaphor. This is because it is required for consideration of clear interaction spaces for remote areas, users, and input devices. The augmented space in which virtual objects of interest (OoIs) are registered in real space has a world coordinate system. All objects in this space are combined with world coordinates, but also have local coordinate systems with their transformations. A user wearing a head-worn display (HWD) with a camera is a separate object in this space. The present invention sets the user's coordinate system as the origin of a perspective projection virtual camera. Therefore, it is calculated as a relative transformation of all traceable objects. In this context, a large volume based on a viewing frustum of the camera is defined as ideal egocentric interaction spaces.

The egocentric interaction spaces are separated into two parts which depend on primary interaction criteria as illustrated in FIG. 2. The egocentric space with detection (ESD) within a detection range is a larger frustum filtered by the user's field of view (hereinafter referred to as fov). All real and virtual objects that are far apart reside here and have transformation related to user coordinates. Transformation of the selected subspace is also created in this space. The size of the frustum is determined by a clipping distance of the virtual camera. In fact, this is tightly coupled with its performance for an available tracker and a target augmented space. IsoScale planes have their own geometric transformations and are useful for mapping with adjusted size in all indirect controls that have the same width and height as the pixel size of a display screen used. The present invention can obtain the transformation of the IsoScale plane from the following two conditions. First, the position of the IsoScale plane is on a center line of the ESD. Second, the z distance of the IsoScale plane is proportional to a clipping plane of the ESD.

On the other hand, an egocentric space within touch (EST) within a touch range is smaller than the viewing frustum for free hand pointers by a real-time three-dimensional (3D) pinch-tip detection. The size of the EST is equal to the overlapping space between a motor space and an ESD. Therefore, it is reachable in a 3D area for the user's action using both hands. Since Vmin is too close, Vmin is an inconvenient area with free hand pointers. On the other hand, Vmax is intended to be a comfortable range of pointers by both hands at any position. This idea came from an intimate zone of a personal space. A difference between Vmax and Vmin is used for a distance that can be touched for indirect one-dimensional control.

A subspace is newly generated as a 3D object by using context information of the adjacent objects of interest (OoIs) and geometric transformation including environments thereof.

The problem to be solved by the present invention is that, unlike volumetric selection for helping a single object selection or referencing, egocentric selection for elaborately acquiring remote 3D areas of interest.

Since it is focused on an environment using a monocular video see-through HWD, the subspace selection is performed within a single view frustum. The view frustum is divided into two egocentric spaces according to interaction objects. First, the ESD is a large frustum in the visual frustum where detection and tracking operates and is a space in which real and virtual objects that do not reach the hand mainly reside. Therefore, the selected subspace including the objects exists in the ESD. On the other hand, the EST is a smaller frustum including intersection of the motor space and the ESD. The EST is a space in which a 3D hand input by both hands is operated for subspace selection.

The present invention newly defines a subspace having an arbitrary size and shape including objects of interest in the ESD and surrounding areas thereof. The subspace is defined as a cuboid that satisfies the following considerations.

1. The subspace is a space including at least one object. An empty space in which an object does not affect is unlikely to be utilized even if it is selected by the user.

2. It must have 3D geometric information including position, rotation, and scale values based on a global coordinate system.

3. It must be able to be expressed in a formal geometric form. It is important to reduce a computational cost of describing and manipulating remote 3D subspaces in terms of a wearable augmented reality system. Since it is a wearable computing system using a bare hand input that are less subject to time and space constraints, fewer data and calculations required for subspace technology can maintain good system performance. Informal geomorphic subspaces with no rules add computational load and complicate user actions.

4. It should also be able to cover a space of non-uniform scale. Uniform scale shapes such as spheres or cubes are not suitable for describing longish, wide and flat 3D areas of interest. In particular, spheres are difficult for a user to determine rotation without additional information.

Based on the above considerations, the present invention simplifies the problem of effectively determining the position, rotation, and scale of any remote cuboid including the object of interest on the ESD by using the 3D bare hand input in the EST so as to acquire a subspace in the augmented space.

Perception is a step of acquiring an imaginary subspace corresponding to a subspace desired by a user in an augmented scene. This is a mental selection process essential for the user to specify a subspace by bare hand interaction. First, the user finds fov by taking into account the user's position and the perspective of the augmented objects. The viewport at this time fully reflects the interaction of space units in the future. In particular, the fov that the user sees in space is an important clue to provide the system with rotation information when selecting the subspace. In the fov where the user is staying, imaginary subspace drawing is performed very quickly by a human visual recognition process for defining the region of interest. The human eye is divided into an area concentrated by central vision and an area not concentrated by peripheral vision according to the degree of interest in sight. Therefore, a continuous focused area due to a trace of a central time can be regarded as an area of interest in the user's gaze. Thus, the recognition step at the egocentric viewpoint memorizes the informal 3D region of interest and reproduces it as a regular area naturally through targeting and refinement steps.

Figure 3:
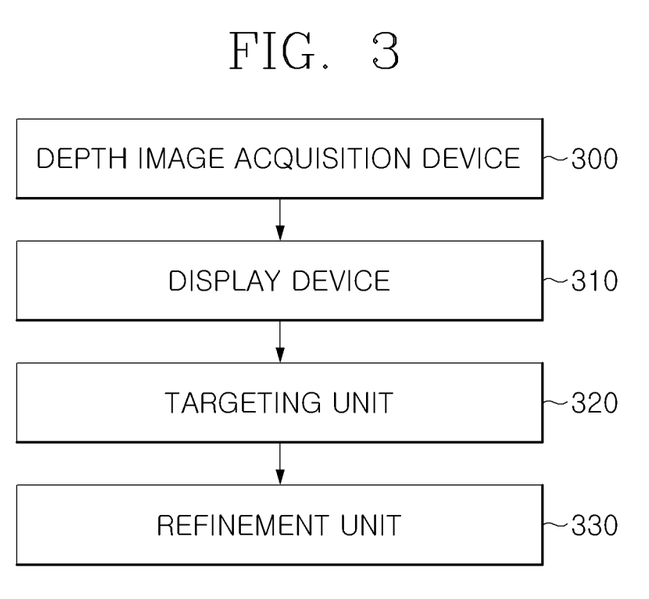
FIG. 3 is a diagram illustrating a configuration of a system for acquiring a subspace in an augmented space, according to an embodiment of the present invention.

FIG. 3 is a diagram illustrating a configuration of a system for acquiring a subspace in an augmented space, according to an embodiment of the present invention.

Referring to FIG. 3, the system for acquiring the subspace in the augmented space, according to an embodiment of the present invention, includes a depth image acquisition device 300, a display device 310, a targeting unit 320, and a refinement unit 330.

The depth image acquisition device 300 may be a Kinect commercially available from Microsoft, but is not limited thereto. Any devices that can provide depth information can be used.

The depth image acquisition device 300 mainly includes an RGB color camera, a 3D depth sensor, four microphone arrays, and a tilt motor capable of moving a sensor up and down. Therefore, the depth image acquisition device 300 is capable of acquiring a 3D image from the 3D depth sensor.

The display device 310 may be a monocular video see-through HWD, but is not limited thereto. Any devices that can display 3D images acquired from the depth image acquisition device 300 can be used.

The targeting unit 320 acquires a first subspace of a first 3D shape corresponding to an action of the user when an event by the user's action is generated in a 3D image displayed on the display device.

The refinement unit 330 acquires a second subspace of a second 3D shape, of which position and scale are adjusted according to the user's gesture within the range of the first subspace acquired by the targeting unit.

Figure 4:
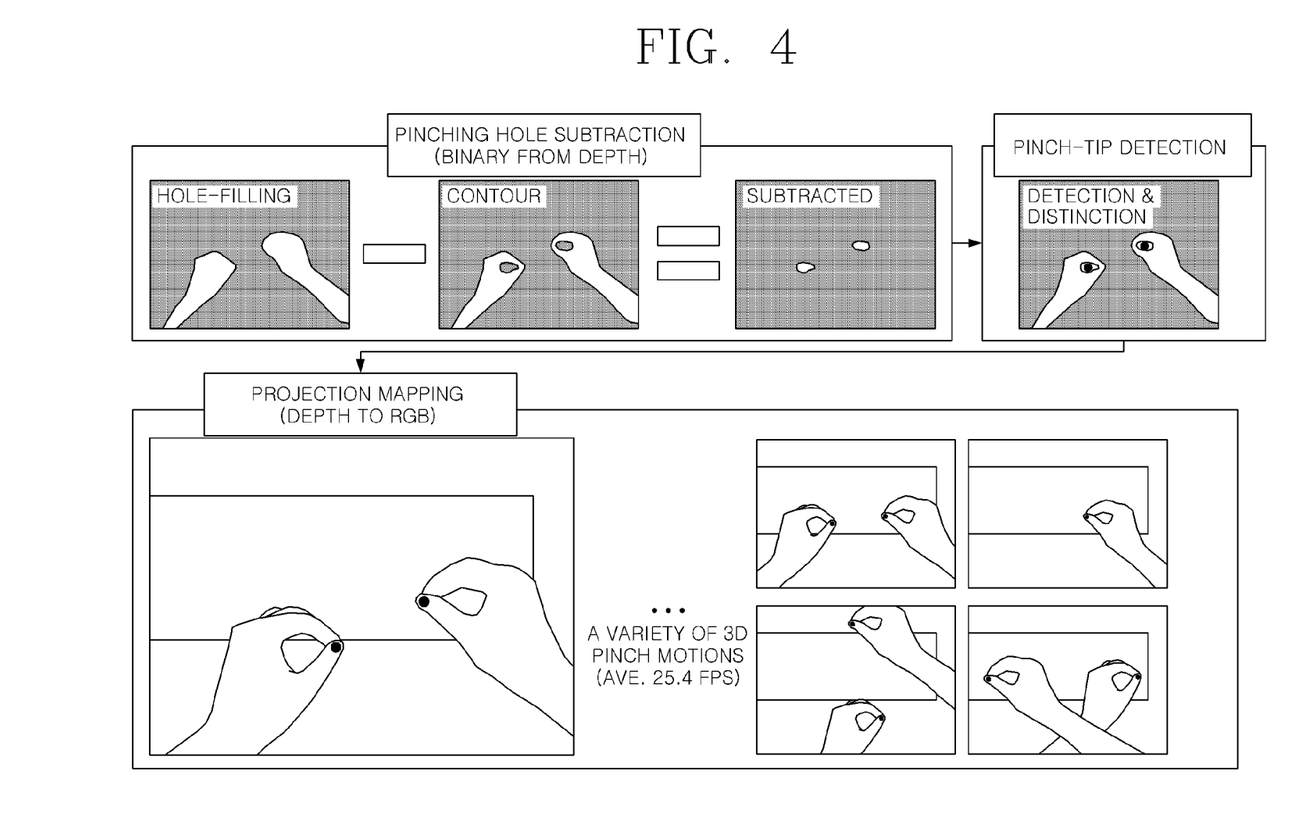
FIG. 4 is a diagram illustrating a method for implementing a three-dimensional (3D) pinch-tip input.

FIG. 4 is a diagram illustrating a method for implementing a 3D pinch-tip input.

The present invention directly implements a real-time bare hand input for selecting a subspace in an augmented space, which is difficult to reach directly, from a long distance. 3D pinch position and operation in an egocentric space within touch (EST) is recognized by an RGB-D camera attached to a head worn display (HWD) without the aid of an additional device.

From a Wilson and Ha's method, a 3D pinch input tool in a fast and robust wearable AR environment was inspired. Unlike complicate hand feature detection and learning algorithms, Wilson proposed a simple and robust pinching hole detection method through image subtraction at fixed RGB input. In addition, there was proposed a wearable AR coordinate system that integrated the coordinates of palm detected from an RGB-D camera attached to an HWD at an egocentric metaphor.

The present invention more quickly detects a pinch tip position by a pinch hole from a depth sensor (depth image acquisition device) attached to the HWD and combines the pinch tip position with a 3D coordinate system based on the HWD.

FIG. 4 illustrates the result of the implementation of a positional 3DoF pinch tip input capable of distinguishing both hands from each other. A condition in which an arm meets a boundary of a screen kinematically in an egocentric viewpoint and a thickness test of a pixel from the center of the hole are implemented to distinguish both hands quickly and robustly under normal circumstances.

The detected 3D position can be used as a virtual hand metaphor in the EST. However, in the present invention, the 3D position is mapped on a 2D RGB screen and used as a 2D cursor in the targeting unit 320, and is separated and used as a 1D controller for depth adjustment of a cuboid in the refinement unit 330. The state of the pinch input tool is divided into idle, pinch, and release, and a selection trigger applies a release-to-select method for selection to reduce a Heisenberg effect.

Referring to FIG. 4, (1) a binary image acquired from a depth image attached to the HWD and an image filled with holes are acquired, and (2) an image corresponding to a pinch hole is acquired from a difference image between the two images.

(3) The hand of the corresponding pinch is distinguished through the calculation of the center point by the elliptic fitting and the hand discrimination condition. More specifically, (A) on the assumption that the hand comes in normally at the egocentric viewpoint, a thickness test (comparison of the number of pixels) is performed on the x-axis (horizontal direction) from the center point of the detection ellipse (for example, a left hand when a left side is thick). (b) In case of encountering the left or right boundary during the primary test, an image boundary touch test of the corresponding hand is performed.

(4) The pinch tip of the longest distance among the convex points is selected after the hand discrimination.

(5) A 2D point is projected to a 3D (2D position+depth) RGB image according to the calibration given in advance.

Figure 5:
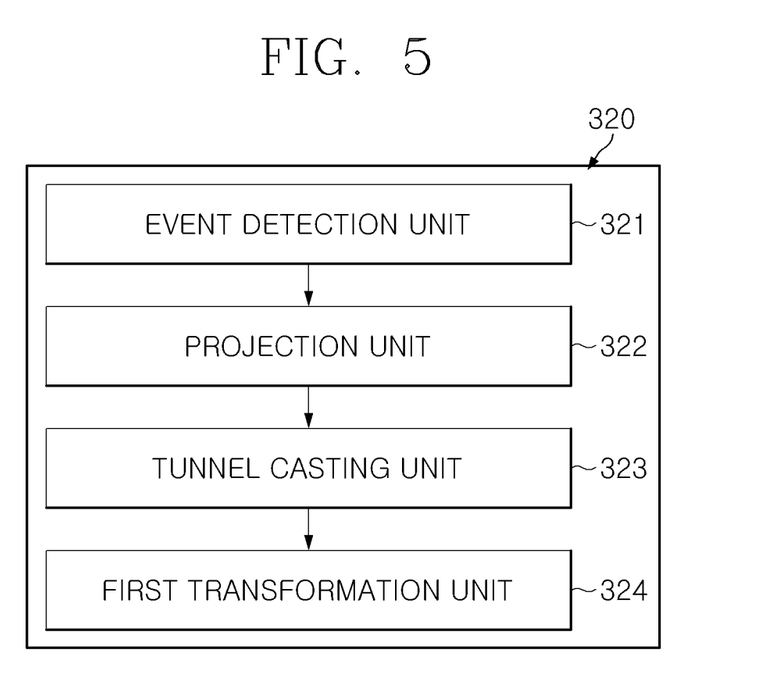
FIG. 5 is a diagram illustrating an internal configuration of a targeting unit.
Figure 6:
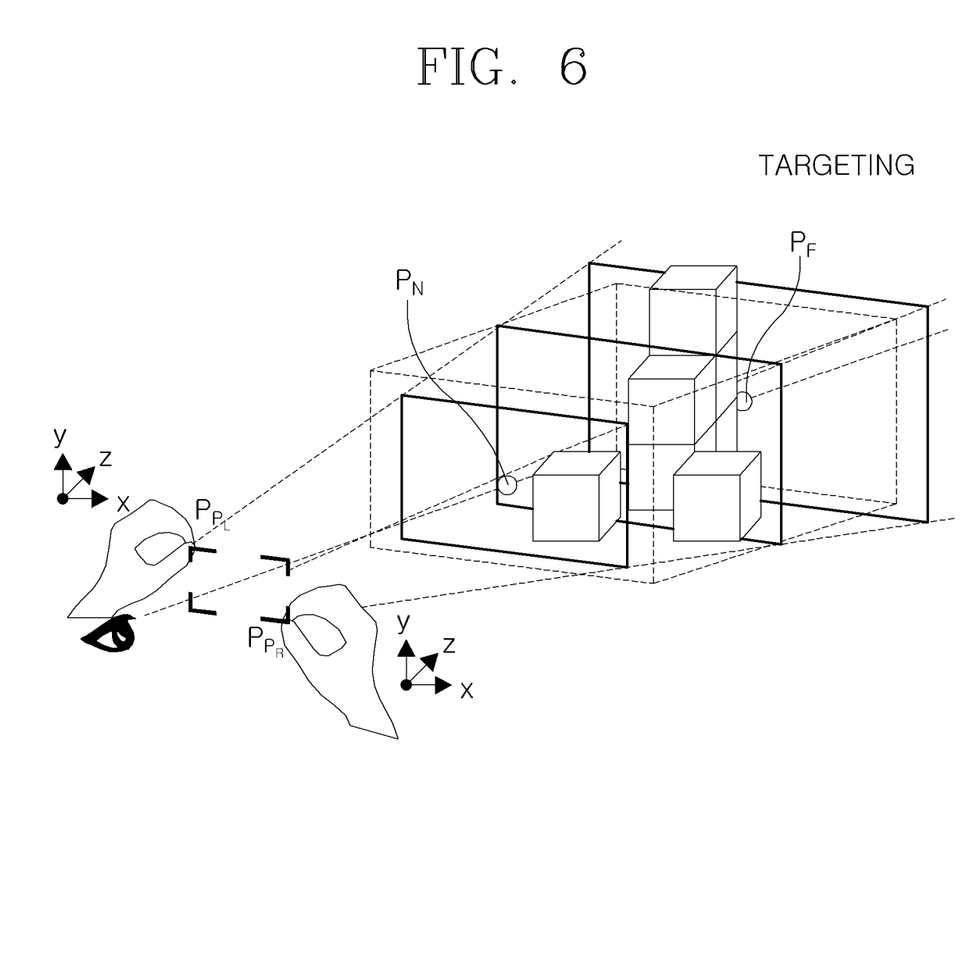
FIG. 6 is a plan view illustrating the operation of the targeting unit.

FIG. 5 is a diagram illustrating the internal configuration of the targeting unit, and FIG. 6 is a plan view illustrating the operation of the targeting unit.

The targeting unit 320 is a unit that acquires an initial subspace of a maximum scale including an imaginary subspace by taking into account the spatial context of objects appearing in the fov.

A large cuboid corresponding to the initial subspace is acquired by using object collision information in a tunnel passing through a 2D region of interest (RoI) drawn by the user. The space acquired in the above manner necessarily includes an imaginary subspace.

Referring to FIGS. 5 and 6, the targeting unit 320 includes an event detection unit 321, a projection unit 322, a tunnel casting unit 323, and a first transformation unit 324.

The event detection unit 321 determines a user's action in a 3D image as an event occurrence.

That is, the event detection unit 321 determines a pinch and release event operation by a user's two-handed pinch tip pointer in the 3D image as the event occurrence by the user's action.

Specifically, the event detection unit 321 draws a RoI frame including a 3D area of interest on a HWD screen by using the pinch and release operation by the user's two-handed pinch tip pointer. A frame size at this time is key information for determining the width and height of the tunnel generated from the user's eyes which will be described later.

The projection unit 322 forms the tunnel by projecting a 2D frame formed by the user's action determined by the event detection unit 321 into a 3D space.

That is, the projection unit 322 forms the tunnel by projecting the 2D frame foamed by the pinch and release operation by the user's two-handed pinch tip pointer into the 3D space in the 3D image.

Specifically, the projection unit 322 projects the 2D frame drawn on the screen to the 3D space so as to expand the RoI frame drawn with the 3D area of interest by the event detection unit 321 into the tunnel. This is solved by using the same scale plane (IsoScale plane) with the same isomorphic scale as the pixel resolution of the HWD. The same scale plane at this time is a 2D plane on a 3D image with the same translation and rotation as the origin of the camera coordinate system except for the z value. The z value of the same scale plane can be easily calculated by using a proportional formula with a near or far plane constituting a camera frustum. Thus, the same scale plane can be effectively used for occlusion selection using screen coordinates. The effective area in the tunnel passing through the RoI is determined through two-way tunnel-casting which will be described later.

The tunnel casting unit 323 performs forward casting and backward casting by projecting a set of rays to the tunnel formed by the projection unit 322.

That is, the tunnel casting unit 323 performs forward casting that finds a first collision point nearest from an eye that first collides with augmented objects where a set of rays projected from a user's eye exists in the tunnel, and backward casting that finds a first collision point farthest from the eye that first collides with augmented objects existing in the tunnel by projecting the same set of rays as the forward casting in an opposite direction.

Specifically, the two-way tunnel-casting of the tunnel casting unit 323 is an automatic selecting method for limiting only an effective area in which objects exist in the tunnel extending to the end of the visual frustum. Basically, since the subspace is centered around objects, foremost and rearmost void areas are excluded from the entire tunnel. In the present invention, this is referred to as an inclusive frustum. In the two-way tunnel-casting, the set of rays performing the tunnel casting fully utilizes the context of the colliding augmented objects. First, forward casting is performed to find the first collision point closest from the eye. At this time, a near plane (first plane) of the frustum including a slice plane parallel to the tunnel including the shortest distance collision point is determined. Backward casting is performed so as to determine a far plane of the inclusive frustum. This is a process of finding the farthest collision point from the eye. The first collision point is found by irradiating the same set of rays as the forward casting in an opposite direction. The slice plane parallel to the tunnel including the collision point acquired in the above manner is defined as the far plane (second plane) of the inclusive frustum. The size of the inclusive frustum is determined by the sliced first and second planes in the tunnel.

The first transformation unit 324 transforms the frustum acquired by the tunnel casting unit to acquire the first subspace of the first 3D shape.

That is, as described in the tunnel casting unit 323, the first transformation unit 324 acquires a first subspace by transformation into a first 3D shape having the same position, rotation, and volume according to the definition of a subspace predetermined based on a center of a frustum including a first plane, which is the slice plane parallel to the tunnel including the first collision point nearest from the eye, and the second plane, which is the slice plane parallel to the tunnel including the first collision point farthest from the eye.

The first 3D shape transformed by the first transformation unit 324 is preferably a cuboid, but the shape of the 3D shape is not limited thereto.

Figure 7:
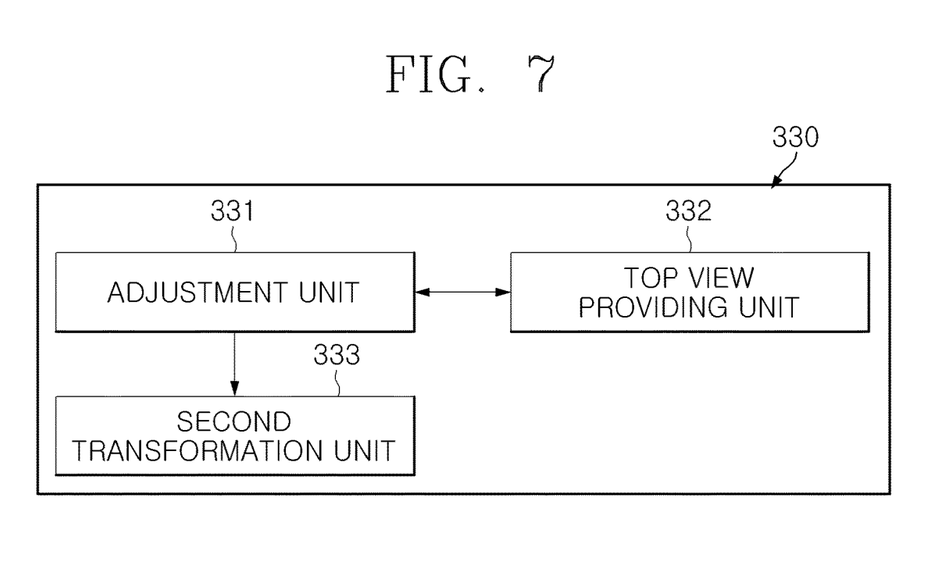
FIG. 7 is a diagram illustrating an internal configuration of a refinement unit.
Figure 8:
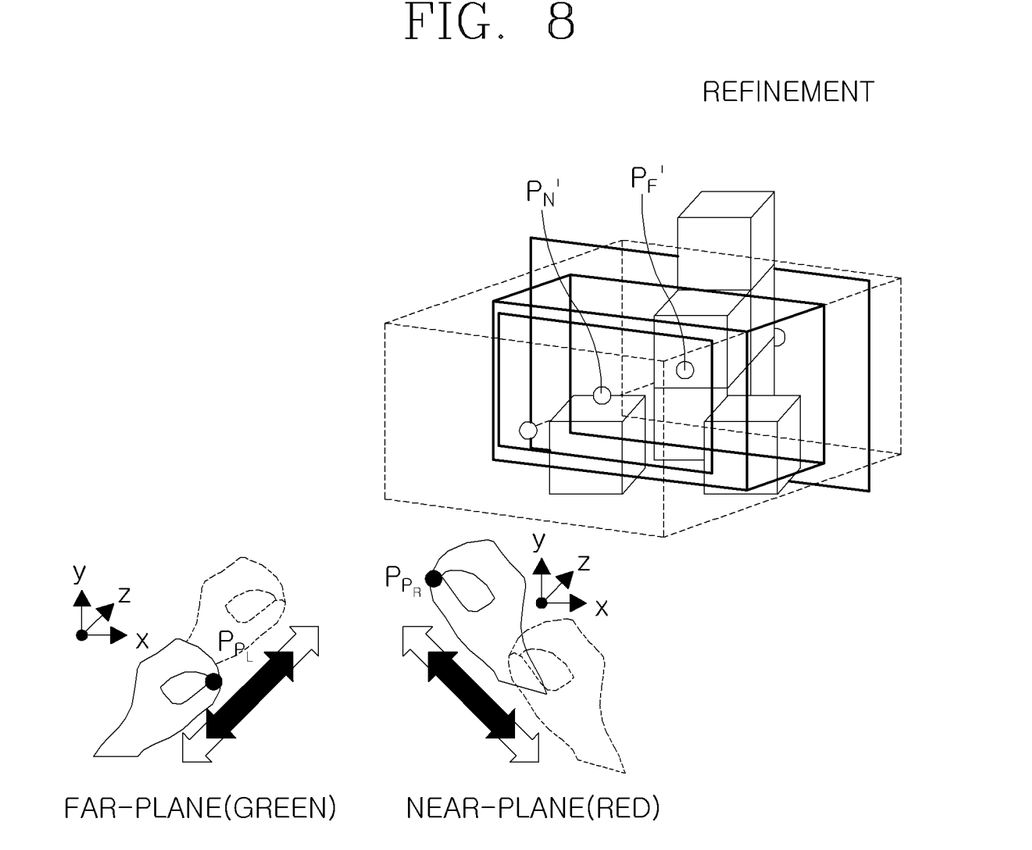
FIG. 8 is a plan view illustrating the operation of the refinement unit.

FIG. 7 is a diagram illustrating the internal configuration of the refinement unit, and FIG. 8 is a plan view illustrating the operation of the refinement unit.

The refinement unit 330 adjusts a position and a scale within the initial subspace range through a similar pinch interaction to determine a second subspace of a second 3D shape that is a final subspace. Although the foremost and rearmost void spaces are excluded by the targeting unit 320, unwanted objects may still be included due to occlusion or depth recognition at the egocentric viewpoint. Therefore, the unnecessary space included in the front and back sides by a user slicing is removed again. The user can directly change the positions of the near and far planes of the inclusive frustum to obtain a result close to the desired subspace.

FIGS. 7 and 8, the refinement unit 330 includes an adjustment unit 331, a top view providing unit 332, and a second transformation unit 333.

The adjustment unit 331 forms a new subspace through a user's two-handed pinch gesture within the range of the first subspace acquired by the targeting unit 320.

That is, the adjustment unit 331 forms a new subspace by directly changing through a relative scale mapping according to the user's two-handed pinch gesture within the range of the first subspace acquired by the targeting unit 320.

Specifically, the adjustment unit 331 performs the relative scale mapping on the two planes of the inclusive frustum according to the two-handed pinch gesture. This is done for effectively slicing the inclusive frustum having a variable depth in a predetermined motion space. Therefore, when a physical distance of the inclusive frustum is determined by the targeting unit 320, a scale mapping ratio may be slightly changed according to an allowable depth measurement range of the pinch input. This is not suitable for very fine depth control, but it is effective for start and end searching without frequent clutching. In the present invention, a dominant hand and a nondominant hand correspond to the near and far planes, respectively. The movement of the plane corresponding to each hand operates independently within the inclusive frustum, and the far plane is designed not to go beyond the near plane. Whenever the movement of the plane is made, the result of performing the new cuboid transformation is provided to the user.

The top view providing unit 332 provides a top view of the first subspace acquired by the targeting unit 320 to help the adjustment unit 331 form a subspace through the user's two-handed pinch gesture.

That is, the top view providing unit 332 provides a top view by orthogonal projection by taking into account the scale of the first subspace acquired by the targeting unit 320 and helps the adjustment unit 331 form the subspace through the user's two-handed pinch gesture.

Specifically, the top view providing unit 332 additionally provides an instant map which is a virtual camera so as to help the user adjust the depth. Although fixed rotation in the initial subspace enables the depth adjustment to be made to a viewport switching according to the movement of the user, it is very inconvenient to avoid the occlusion and check the depth each time. In order to solve this problem, the instant map provides the top view of the region of interest that the user cannot see at the egocentric viewpoint, such as a game or a navigation. There is provided a virtual top view camera by orthogonal projection by taking into account the scale at the location of the inclusive frustum at the top right, similar to a Google glass display. Therefore, the user can visually confirm the depth shift of both sides and the result of the subspace transformation more easily and quickly.

The second transformation unit 333 transforms the subspace newly formed by the adjustment unit 331 to acquire the second subspace of the second 3D shape.

The second transformation unit 333 acquires the second subspace by transforming the subspace newly formed by the adjustment unit into the second 3D shape having the same position, rotation, and volume according to the definition of the predetermined subspace.

The second 3D shape transformed by the second transformation unit 333 is preferably a cuboid, but the shape of the 3D shape is not limited thereto.

Figure 9:
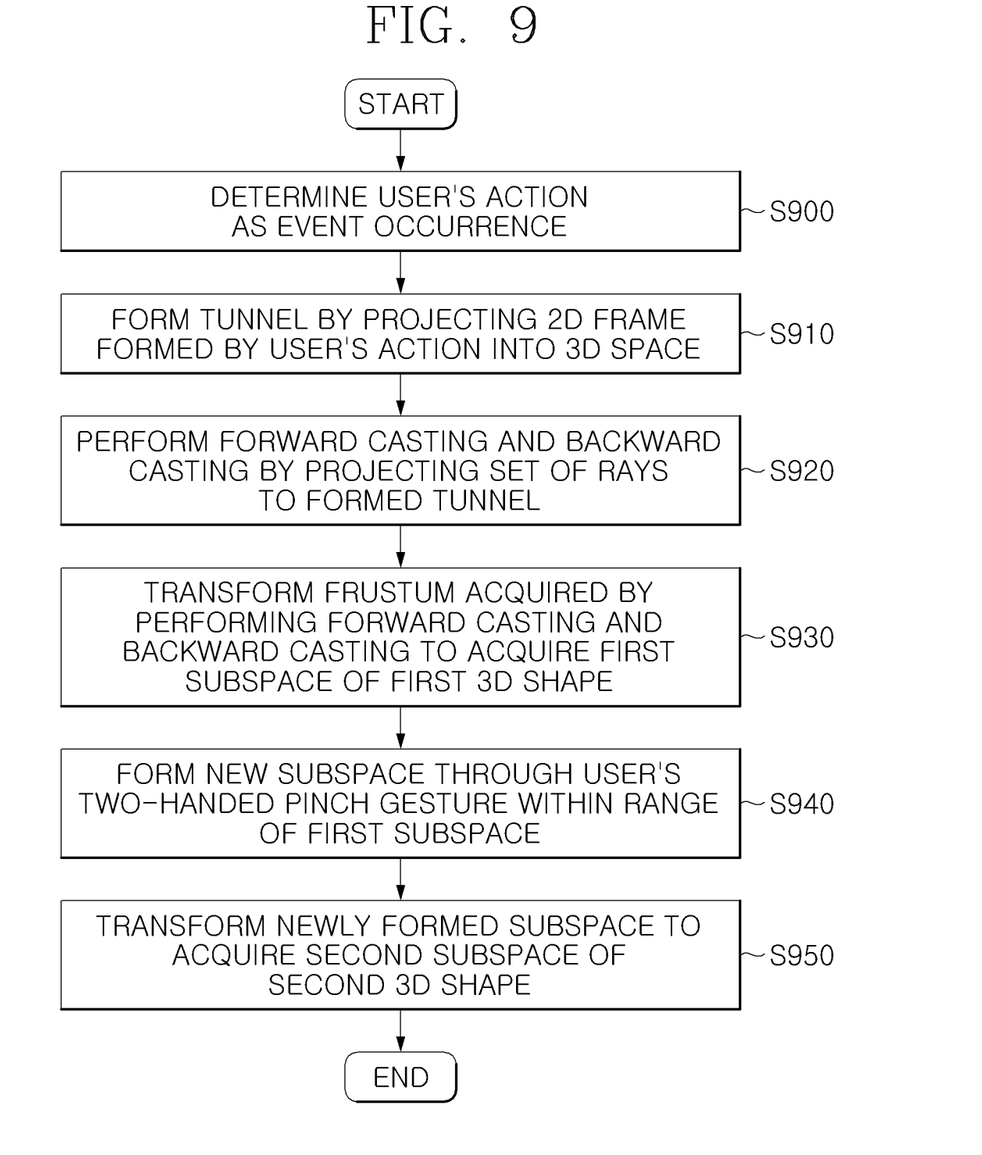
FIG. 9 is a flowchart of a method for acquiring a subspace in an augmented space, according to an embodiment of the present invention.

FIG. 9 is a flowchart of a method for acquiring a subspace in an augmented space, according to an embodiment of the present invention.

Referring to FIG. 9, the event detection unit 321 determines an action of a user in a 3D image as an event occurrence (S900). That is, the event detection unit 321 determines a pinch and release event operation by a user's two-handed pinch tip pointer in the 3D image as the event occurrence by the user's action.

The projection unit 322 forms a tunnel by projecting a 2D frame formed by the determined action of the user into a 3D space (S910). That is, the projection unit 322 forms the tunnel by projecting the 2D frame formed by the pinch and release operation by the user's two-handed pinch tip pointer into the 3D space in the 3D image.

The tunnel casting unit 323 performs forward casting and backward casting by projecting a set of rays to the formed tunnel (S920). That is, the tunnel casting unit 323 performs forward casting that finds a first collision point nearest from an eye that first collides with augmented objects where a set of rays projected from a user's eye exists in the tunnel, and backward casting that finds a first collision point farthest from the eye that first collides with augmented objects existing in the tunnel by projecting the same set of rays as the forward casting in an opposite direction.

The first transformation unit 324 transforms the frustum acquired by performing the forward casting and the backward casting to acquire the first subspace of the first 3D shape (S930). That is, the first transformation unit 324 acquires a first subspace by transformation into a first 3D shape having the same position, rotation, and volume according to the definition of a subspace predetermined based on a center of a frustum including a first plane, which is the slice plane parallel to the tunnel including the first collision point nearest from the eye, and the second plane, which is the slice plane parallel to the tunnel including the first collision point farthest from the eye.

The adjustment unit 331 forms a new subspace through a user's two-handed pinch gesture within the range of the acquired first subspace (S940). That is, the adjustment unit 331 forms a new subspace by directly changing through a relative scale mapping according to the user's two-handed pinch gesture within the range of the first subspace acquired by the targeting unit 320.

The second transformation unit 333 transforms the newly formed subspace to acquire the second subspace of the second 3D shape (S950). That is, the second transformation unit 333 acquires the second subspace by transforming the subspace newly formed by the adjustment unit into the second 3D shape having the same position, rotation, and volume according to the definition of the predetermined subspace.

FIG. 6 is a plan view illustrating the operation of the targeting unit, and FIG. 8 is a plan view illustrating the operation of the refinement unit.

Referring to FIGS. 6 and 8, when the center of the second subspace of the second 3D shape acquired by the targeting unit 320 and the refinement unit 330 according to the present invention is $C(r_C, p_C, s_C)$, the rotation $(Rotation(r_C))$ is $r_C = r_E$ (same as viewing angle). That is, it is the same as the direction that the user views.

The position $(Position(p_C))$ is expressed as Equation 1.

$$p_C = \frac{p_{N'} - p_{F'}}{2} = \frac{1}{2}(p_N + \alpha(p_F - p_N) + p_N + \beta(p_F - p_N)) \quad \text{[Equation 1]}$$

$$= p_N + \frac{(\alpha + \beta)(p_F - p_N)}{2}, \, (0 \leq \alpha, \beta \leq 1, \alpha \leq \beta)$$

$$\alpha = \begin{cases} 0, & \text{if } p_{P_R}[z] < V_{min} \\ 1, & \text{if } p_{P_R}[z] > V_{max} \\ (p_{P_R}[z] - V_{min})/(V_{max} - V_{min}), & \text{otherwise} \end{cases}$$

$$\beta = \begin{cases} 0, & \text{if } p_{P_R}[z] < V_{min} \\ 1, & \text{if } p_{P_R}[z] > V_{max} \\ (p_{P_L}[z] - V_{min})/(V_{max} - V_{min}), & \text{otherwise} \end{cases}$$

Here, the middle of the center positions $p_N'$ and $p_F'$ of new plane is the center of the new second subspace.

Also, $\alpha$ is a coefficient associated with a right hand, that is, the near plane, and $\beta$ is a coefficient associated with a left hand, that is, a far plane. A value of $\alpha$ is associated with a distance that the right hand moves in the z axis, and $\beta$ is associated with a distance that the left hand moves in the z axis.

The scale $(Scale(s_C))$ is expressed as Equation 2.

$$s_C = 2e_C \begin{bmatrix} x \\ y \\ z \end{bmatrix} = \begin{bmatrix} \frac{\|p_{N'}\|}{\|p_N\|}e_N[x] + \frac{\|p_{F'}\|}{\|p_F\|}e_F[x] \\ \frac{\|p_{N'}\|}{\|p_N\|}e_N[y] + \frac{\|p_{F'}\|}{\|p_F\|}e_F[y] \\ \|p_F' - p_N'\| \end{bmatrix}, \quad \text{[Equation 2]}$$

$$\left(\frac{\|p_{N'}\|}{\|p_N\|} \geq 1, \frac{\|p_{F'}\|}{\|p_F\|} \leq 1\right)$$

Here, $\|\blacksquare\|$ is a symbol for transforming a vector into a scalar, $e_N[x]$ is an extent value on the x axis of the near plane, and $e_F[x]$ is an extent value on the x axis of the far plane.

The present invention can be applied to education, business, telemedicine, and multilateral learning, and can be applied to any field as long as it is necessary to acquire a subspace and to interact with objects existing in the subspace.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A system for acquiring a subspace in an augmented space, the system comprising:
    a targeting unit configured to, when an event by a user's action is generated in a three-dimensional (3D) image displayed on a display device, acquire a first subspace of a first 3D shape corresponding to the user's action; and
    a refinement unit configured to acquire a second subspace of a second 3D shape, of which position and scale are adjusted according to a user's gesture within a range of the first subspace acquired by the targeting unit,
    wherein the targeting unit comprises:
        an event detection unit configured to determine the user's action in the 3D image as an event occurrence;
        a projection unit configured to form a tunnel by projecting a two-dimensional (2D) frame formed by the user's action determined by the event detection unit into a 3D space;
        a tunnel casting unit configured to perform forward casting and backward casting by projecting a set of rays to the tunnel formed by the projection unit; and
        a first transformation unit configured to transform a frustum acquired by the tunnel casting unit to acquire the first subspace of the first 3D shape.

2. The system of claim 1, wherein the refinement unit comprises:
    an adjustment unit configured to form a new subspace through a user's two-handed pinch gesture within the range of the first subspace acquired by the targeting unit;
    a top view providing unit configured to provide a top view of the first subspace acquired by the targeting unit to help the adjustment unit form a subspace through the user's two-handed pinch gesture; and a second transformation unit configured to transform the subspace newly formed by the adjustment unit to acquire the second subspace of the second 3D shape.

3. The system of claim 2, wherein the adjustment unit forms the new subspace by directly changing through a relative scale mapping according to a user's two-handed pinch gesture within the range of the first subspace acquired by the targeting unit.

4. The system of claim 2, wherein the top view providing unit provides a top view by orthogonal projection by taking into account a scale of the first subspace acquired by the targeting unit and helps the adjustment unit form the new subspace through a user's two-handed pinch gesture.

5. The system of claim 2, wherein the second transformation unit acquires the second subspace by transforming the subspace newly formed by the adjustment unit into the second 3D shape having the same position, rotation, and volume according to definition of a predetermined subspace.

6. The system of claim 1, wherein the event detection unit determines a pinch and release event operation by a user's two-handed pinch tip pointer in the 3D image as the event occurrence by the user's action.

7. The system of claim 1, wherein the projection unit forms the tunnel by projecting the 2D frame formed by a pinch and release operation by a user's two-handed pinch tip pointer into the 3D space in the 3D image.

8. The system of claim 1, wherein the tunnel casting unit performs forward casting that finds a first collision point nearest from an eye that first collides with augmented objects where a set of rays projected from a user's eye exists in the tunnel, and backward casting that finds a second collision point farthest from the eye that first collides with augmented objects existing in the tunnel by projecting the same set of rays as the forward casting in an opposite direction.

9. The system of claim 1, wherein the first transformation unit acquires the first subspace by transformation into a first 3D shape having the same position, rotation, and volume according to definition of a subspace predetermined based on a center of a frustum including a first plane, which is a slice plane parallel to the tunnel including a first collision point nearest from the eye, and a second plane, which is a slice plane parallel to the tunnel including a second collision point farthest from the eye.

10. The system of claim 1, wherein the first and second 3D shapes are a cuboid.

11. A method for acquiring a subspace in an augmented space, the method comprising:
a first step of determining, by an event detection unit, a user's action in a three-dimensional (3D) image as an event occurrence;
a second step of forming, by a projection unit, a tunnel by projecting a 2D frame formed by the determined action of the user into a 3D space;
a third step of performing, by a tunnel casting unit, forward casting and backward casting by projecting a set of rays to the formed tunnel;
a fourth step of transforming, by a first transformation unit, a frustum acquired by performing the forward casting and the backward casting to acquire a first subspace of a first 3D shape;
a fifth step of forming, by an adjustment unit, a new subspace through a user's two-handed pinch gesture within a range of the first subspace acquired by a targeting unit; and
a sixth step of transforming, by a second transformation unit, the newly formed subspace to acquire a second subspace of a second 3D shape.

12. The method of claim 11, wherein the user's action in the first step is a pinch and release operation by a two-handed pinch tip pointer.

* * * * *